United States Patent Office 3,227,675
Patented Jan. 4, 1966

1

3,227,675
SILANE-TREATED CLAY REINFORCED
RESIN COMPOSITIONS
John G. Papalos, Borger, Tex., assignor to J. M. Huber Corporation, Locust, N.J., a corporation of New Jersey
No Drawing. Filed May 1, 1963, Ser. No. 277,122
3 Claims. (Cl. 260—41)

This invention relates to kaolin clay modified with polyfunctional silicones. More particularly, this invention relates to kaolin clay surface modified with organo functional silanes.

When kaolin clays are modified with organo functional silanes according to this invention, the properties imparted to the kaolin are such that they can advantageously be used as fillers for natural and synthetic rubbers, thermosetting resins such as polyurethanes, epoxy polymers, melamine polymers, phenolic polymers, urea-formaldehyde polymers, unsaturated polyesters, as well as other polymers and elastomers including polyethylenes, polypropylenes, polystyrenes, saturated polyesters, polyamides, polyvinyl compounds, polyisoprenes, ethylene-propylene, polybutadienes, polystyrene-butadiene, styrene-butadiene, and the like.

Kaolin clays modified with the organo functional silanes according to this invention can also serve as intermediates for synthesis of new pigments which are useful as fillers for the polymers, elastomers and resins such as those previously mentioned. This is so because the silanes used to modify the kaolin clays are di or polyfunctional and only one functional group, the silane, is attached to the clay, leaving the remaining reactive groups free to react further. Theoretically, the organo functional group can attach to the clay; however, laboratory tests indicate that the silane group, in fact, attaches to the clay.

It is the presence of these organo functional groups which account for the ability of the modified kaolin to act as a filler in crosslinked (thermosetting) resins such as crosslinked polyethylene, polyesters and epoxies. The criteria for a successful filler for thermosetting resins as well as other plastics and elastomers, includes, among other things, the crosslinking characteristics of the pigment. A pigment with good crosslinking ability can be advantageously used as a high loading filler in most matrices. Kaolin clays modified with organo functional silanes exhibit good crosslinking characteristics and are also useful in applications as a filler where heretofore clay had no value.

The modified kaolin clays of this invention can, in addition to other uses, be advantageously used as fillers for paper, paints, varnishes, inks and paper coating compositions as well as intermediates for attaching reagents such as plasticizers, antioxidants, ultraviolet light screeners, and dyes to clay pigment surfaces.

The modified kaolin clays of this invention are generally organophilic and are not hydrophobic.

An object of this invention is to provide modified kaolin clays especially useful as fillers.

Another object of this invention is to provide modified kaolin clays useful as fillers in applications where clays had not been previously useful.

Other objects and advantages will be apparent from the following specification.

2

I am aware of extensive efforts in the prior art to improve properties of filler pigments by modification with organosilanes. Hydrocarbon silane modifications of pigments do impart improved dispersions in organic vehicles but such modifications do not normally increase reinforcement in vinyl addition polymers unless the hydrocarbon silane carries specific types of unsaturation. This unsaturation serves to promote a more tenacious bridge between the filler and the vehicle. In any case, all these modified pigments are rendered hydrophobic by modification with either saturated or unsaturated hydrocarbon silanes and, furthermore, such silane modified pigments are not valuable reinforcing fillers in saturated thermosetting resins.

I have discovered that modification of kaolin clays with organo functional silanes greatly improves the reinforcing properties of the kaolin. The modified clays increase the modulus of natural rubber and EPT (ethylene-propylene dicyclopentadiene terpolymer) rubber when compared to untreated kaolin. When used as a filler in crosslinked resins such as polyurethanes, the modified clays impart exceptional property improvements to the polymer. The modified kaolin clays also display greatly improved dispersibility in organic vehicles.

The modified kaolin clays of this invention can be prepared by dissolving the desired amount of silane in a suitable solvent, adding the clay, and heating until the reaction is complete. The solvent may either be water or a nonaqueous solvent. While the products obtained may vary in properties depending on the solvent used, these variations are a matter of degree only. The amount of modifier added depends upon the particular modifier used and the use for which the modified clay is intended. Generally, up to about 10% by weight of the modifier is sufficient for most purposes, with 0.25% to 5% being the preferred range. The compounds used to modify the pigments can be depicted by the formula

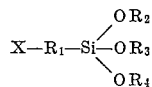

wherein X is selected from the group consisting of hydroxy, epoxy, glycidoxy, carboxy, carbethoxy, epoxy cycloalkyl, cyano, alkoxy, or an alkeneoxy group containing olefinic unsaturation of from 2 to 20 carbon atoms such as methacryloxy; $R_1$ is alkylene, arylene, alkylarylene, arylalkylene, or cycloalkylene; $R_2$ is hydrogen, lower alkyl, aryl, lower alkylaryl or lower arylalkyl; $R_3$ is hydrogen, lower alkyl, aryl, lower alkylaryl or lower arylalkyl; and $R_4$ is hydrogen, lower alkyl, aryl, lower alkylaryl or lower arylalkyl.

The kaolin clays usable in the practice of this invention are those refined kaolin clays which are known and used as fillers in rubber compounds, paper, plastic and paints.

The following examples are illustrative only and are not intended to limit the scope of the invention.

EXAMPLE 1

500 grams of refined South Carolina hard kaolin clay was added to 2000 milliliters of benzene containing 5 grams of methacryloxypropyltrimethoxy silane (sold under the trade name Z–6030 by Dow Corning Corporation, Midland, Michigan) in a 5-liter reaction flask. The reaction mixture was heated to reflux for 3 hours under anhydrous conditions. The reaction mixture was then allowed to cool to room temperature and was filtered. The filter cake was extracted with benzene, dried at 100° C. under a vacuum and then ground. The product contained kaolin clay modified with 1% Silicone Z-6030, based upon the weight of the clay.

EXAMPLE 2

500 grams of a refined South Carolina hard kaolin clay was added to 2000 milliliters of benzene containing 5 grams of glycidoxypropyltrimethoxy silane (sold under the trade name Z-6040 by Dow Corning Corporation, Midland, Michigan) in a 5-liter reaction flask. The reaction mixture was heated to reflux for 3 hours under anhydrous conditions. The reaction mixture was then allowed to cool to room temperature and filtered. The filter cake was extracted with benzene, dried at 100° C. under vacuum and then ground. The product contained kaolin clay modified with 1% Z-6040, based upon the weight of the clay.

*Example 3*

500 grams of a refined South Carolina hard kaolin clay was added to 2000 milliliters of benzene containing 5 grams of 3,4-epoxycyclohexylethyltrimethoxy silane (sold under the trade name Y-4086 by Union Carbide Corporation, New York, New York) in a 5-liter reaction flask. The reaction mixture was heated to reflux for 3 hours under anhydrous conditions. The reaction mixture was then allowed to cool to room temperature and filtered. The filter cake was extracted with benzene, dried at 100° C. under vacuum and then milled. The product contained kaolin clay modified with 1% Y-4086.

The above procedure was repeated to prepare kaolin clays modified with 0.1%, 0.2%, 0.25%, 0.5%, 2%, 5%, and 10% of Z-6040, Y-4086 and Z-6030.

The modified kaolin clays imparted improved properties to polymers when used as a filler. When used as a reinforcing filler in natural rubber, the modified clays imparted some improved properties to the rubber when compared to unmodified kaolin clay.

When used as a reinforcing filler in polyurethanes, particularly solid polyurethane vulcanizates generally called gums, organo functional silanes imparted improved properties of modulus, tear strength and compression set when compared with unmodified kaolin. This is illustrated in the table in which the following formulation was employed:

| | Parts |
|---|---|
| Vibrathane 5003 (a gum elastomer pollurethane sold by Naugatuck Chemical Company) | 100.00 |
| Stearic acid | 0.25 |
| Clay | 60.00 |
| Di-Cup 40C (dicumyl peroxide sold by Hercules Powder Company) | 5.00 |

The compounds were cured for 60 minutes at 307° F.

Table I

| Kaolin Clay Filler Percent Modifier | 300% Modulus | 400% Modulus | Tensile Strength, p.s.i. | Crescent Tear Resistance | Compression at 22 hrs./158° F. | NBS Abrasion Gum=100% | Number of Tests |
|---|---|---|---|---|---|---|---|
| Unfilled | 930-1,070 | 2,580-3,180 | 3,920-4,890 | 63-103 | 4.0-6.2 | 100 | 5 |
| Unmodified Clay Filler | 1,640 | 2,300 | 3,850 | 270 | 34.0 | 93 | 1 |
| 1% Z-6040 | 2,860-3,030 | 3,210 | 2,990-3,260 | 285-330 | 13.9-15.8 | 177.5-198.5 | 2 |
| 1% Z-6030 | 1,450 | 1,830 | 2,930 | | | | 1 |
| 1% Y-4086 | 1,200-1,460 | 1,400-1,700 | 1,540-2,560 | 260-305 | 23.8-27.2 | 131.5 | 2 |

The loading variations produced similar results which varied in degree from the table above.

The data in Table I indicates that when kaolin clay modified with organo functional silanes is used as a reinforcing filler in vulcanizable polyurethane gums, it imparts improved abrasion resistance, tear resistance, compression set and about equal modulus when compared to unmodified clay.

These modified clays are also effective reinforcing fillers in injection molded polyurethanes; for example, when used as a filler for Texin (a polyurethane pellet manufactured by Mobay Chemical Company) increased modulus properties are imparted to the polyurethane when compared to unmodified kaolin.

The foregoing is illustrative only and additional modifications may be made without departing from the substance of the invention as defined in the appended claims.

I claim:

1. A solid polyurethane vulcanizate of improved properties having finely dispersed therein a kaolin clay filler surface modified with up to 10% by weight based on the weight of the clay of a silane selected from the group consisting of methacryloxypropyltrimethoxy silane, glycidoxypropyltrimethoxy silane, and 3,4-epoxycyclolhexylethyltrimethoxy silane.

2. An injection molded polyurethane compound of improved properties having finely dispersed therein a kaolin clay filler surface modified with up to about 10% by weight based on the weight of the clay of a silane selected from the group consisting of methacryloxypropyltrimethoxy silane, glycidoxypropyltrimethoxy silane, and 3,4-epoxycyclohexylethyltrimethoxy silane.

3. An ethylene-propylene compound of improved properties having finely dispersed therein a kaolin clay filler surface modified with up to about 10% by weight based on the weight of the clay of a silane selected from the group consisting of methacryloxypropyltrimethoxy silane, glycidoxypropyltrimethoxy silane, and 3,4-epoxycyclohexylethyltrimethoxy silane.

References Cited by the Examiner

UNITED STATES PATENTS

| 2,721,873 | 10/1955 | MacKenzie et al. | 260—448.2 |
| 2,823,218 | 2/1958 | Speier et al. | |
| 2,831,829 | 4/1958 | Brooks et al. | 106—308 |
| 2,886,460 | 5/1959 | Alexander et al. | 106—308 |
| 2,946,701 | 7/1960 | Plueddemann | 260—448.8 |
| 2,999,851 | 9/1961 | Elmer | 260—40 XR |
| 3,050,477 | 8/1962 | Gmitter et al. | 260—40 XR |
| 3,062,242 | 11/1962 | Vanderbilt | 260—448.8 |
| 3,079,361 | 2/1963 | Plueddemann | 117—100 |

FOREIGN PATENTS 627,933  9/1961  Canada.

MORRIS LIEBMAN, *Primary Examiner.*

A. KOECKERT, *Assistant Examiner.*